(12) United States Patent
Hwang et al.

(10) Patent No.: US 7,132,463 B2
(45) Date of Patent: Nov. 7, 2006

(54) BIODEGRADABLE COMPOSITION HAVING IMPROVED WATER RESISTANCE AND PROCESS FOR PRODUCING SAME

(75) Inventors: Soon-Geun Hwang, Anyang-si (KR); Heon-Moo Kim, Kwangmyung-si (KR); Sung-Arn Lee, Ansan-si (KR); Joo-Yup Eom, Kunpo-si (KR); Kang-Soo Kim, Kyungki-do (KR); Sung-Hwan Yoon, Siheung-si (KR)

(73) Assignee: Youl Chon Chemical Co., Ltd. (KR)

( * ) Notice: Subject to any disclaimer, the term of this patent is extended or adjusted under 35 U.S.C. 154(b) by 95 days.

(21) Appl. No.: 10/490,671

(22) PCT Filed: Jun. 9, 2003

(86) PCT No.: PCT/KR03/01120

§ 371 (c)(1),
(2), (4) Date: Mar. 24, 2004

(87) PCT Pub. No.: WO2004/083311

PCT Pub. Date: Sep. 30, 2004

(65) Prior Publication Data

US 2004/0249021 A1    Dec. 9, 2004

(30) Foreign Application Priority Data

Mar. 21, 2003 (KR) ............. 10-2003-0017795

(51) Int. Cl.
*C08K 11/00* (2006.01)
(52) U.S. Cl. ............. 523/124; 523/128; 523/210; 524/9; 524/13; 524/47; 524/52
(58) Field of Classification Search ........... 523/124, 523/125, 205, 207, 210, 128; 524/9, 13, 524/47, 52
See application file for complete search history.

(56) References Cited

FOREIGN PATENT DOCUMENTS

WO    WO 01/60898    *    8/2001

* cited by examiner

*Primary Examiner*—Edward J. Cain
(74) *Attorney, Agent, or Firm*—Anderson Kill & Olick, PC

(57) ABSTRACT

The biodegradable composition of the present invention comprising a matrix of a fibrous powder coated with an acrylate copolymer and a natural polymer dispersed in the matrix, can be advantageously used in manufacturing disposable containers for fast food, e.g., cup noodles.

16 Claims, 5 Drawing Sheets

BIODEGRADABLE COMPOSITION HAVING IMPROVED WATER RESISTANCE AND PROCESS FOR PRODUCING SAME

FIELD OF THE INVENTION

The present invention relates to a biodegradable composition having improved water resistance and a process for producing same.

BACKGROUND OF THE INVENTION

There have been extensive studies to develop environmentally friend disposable food and beverage containers for fast food based on biodegradable natural polymers and starch. For example, Japanese Laid-open Patent Publication No. Hei 8-311243 discloses a biodegradable foamable composition by compounding a starch polymer, vegetable fibers, metal ions, a blowing agent and an aliphatic polyester.

To impart controlled water-resistivity to such biodegradable polymer compositions, Japanese Laid-open Publication No. Hei 7-97545 discloses a coating agent produced by dissolving a biodegradable aliphatic polyester e.g., polylactic acid, in a halogenated hydrocarbon, e.g., CFC 123 having excellent water resistance and processability. The coating can be applied to a container made of a starch-based material having poor water resistance.

U.S. Pat. No. 6,361,827 provides a method of imparting water resistance to a molded polysaccharide having poor water resistance by bonding to the surface thereof a prolamin such as zein.

Such biodegradable compositions are suitable for a disposable container or package for wrapping fast food having a low moisture content, e.g. hamburger, or dehydrated food. However, the compositions do not provide sufficient resistances to fungi, bacteria and water for a long distribution-storage period, and, in particular, they cannot be used as containers for liquid phase instant food or dehydrated instant food to be cooked with hot water, e.g., cup noodles.

SUMMARY OF THE INVENTION

Accordingly, it is an object of the present invention to provide a biodegradable composition that can be advantageously used in making containers for instant food, e.g., cup noodles, said composition being improved water resistance and storage durability without compromised biodegradability or processability.

The above object of the invention can be accomplished by a biodegradable composition comprising fibrous powder matrix coated with an acrylate copolymer and a natural polymer dispersed in the matrix.

BRIEF DESCRIPTION OF THE DRAWINGS

The above and other objects and features of the present invention will become apparent from the following description of the invention, when taken in conjunction with the accompanying drawings, which respectively show.

DETAILED DESCRIPTION OF THE INVENTION

Figure 1A:
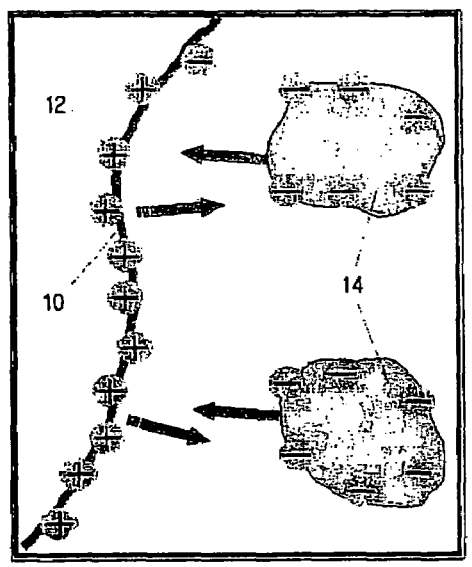
FIG. 1: a schematic diagram of the structure of the biodegradable composition in accordance with one embodiment of the present invention.

In accordance with one aspect of the present invention, the biodegradable composition comprises a matrix of a fibrous powder coated with an acrylate copolymer and a natural polymer dispersed in the matrix.

In accordance with a preferred embodiment of the present invention, the natural polymer is an anionic starch. More preferably, the natural polymer is an anionic starch derived from corn, potato, wheat, rice, tapioca or sweet potato, whose functional group is not substituted.

In accordance with a preferred embodiment of the present invention, the biodegradable composition comprises, based on 100 parts by weight of the natural polymer, 30~50 parts by weight of the fibrous powder and 5~50 parts by weight of the acrylate copolymer.

Preferably, the fibrous powder is derived from one or more cellulose fiber derived from wood, straw, sugarcane, bamboo, woody stem, phloem fiber, leaf fiber or seedlings, and the fiber length of the fibrous powder is in the range of 10 to 90 μm.

The acrylate copolymer preferably has a structure according to formula I below:

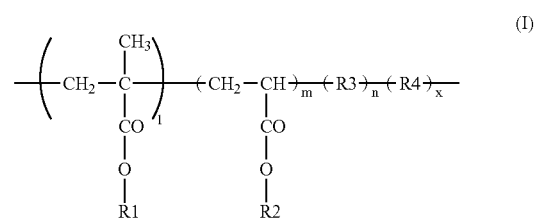

wherein R1 and R2 are independently $C_{1-12}$ alkyl, alkoxyalkyl, hydroxyalkyl, glycidyl or 2-(dimethyl amino)ethyl;

R3 and R4 are independently a repeating unit derived from (meth)acrylic acid, N-methylol acrylamide, styrene, vinylacetate, vinylalcohol, acrylonitrile, acrylamide, maleic anhydride, maleic acid, 1,3-butadiene, diallylphthalate, itaconic acid or neopentylglycol; and l, m, n and x are mole fractions in the ranges of 0.2 to 0.6, 0.1 to 0.6, 0.05 to 0.5 and 0.05 to 0.5, respectively.

More preferably, R1 and R2 are independently selected from methyl, ethyl, isopropyl, n-butyl, isobutyl, tert-butyl, 2-hydroxyethyl, 2-ethoxyethyl, decyl, 2-ethylhexyl, 2-hydroxypropyl, glycidyl, lauryl and 2-(dimethylamino)ethyl.

In a preferred embodiment, the biodegradable composition of the present invention may further comprise one or more preservatives selected from sorbic acid, potassium sorbate, sodium benzoate, sodium propionate, calcium propionate, dehydrosodium acetate and butyl p-hydroxybenzoate. Preferably, 0.05~2% by weight of a preservative based on the total weight of the composition may be present in the biodegradable compositions of the present invention.

In accordance with another aspect of the present invention, there is provided a process for preparing the inventive biodegradable composition comprising mixing a fibrous powder with an acrylate copolymer, a natural polymer, a solvent and, optionally, a preservative at 20~90° C. to prepare a molding composition.

In accordance with a preferred embodiment of the present invention, the mixing step is conducted by a two-step process comprising mixing the fibrous powder with the acrylate copolymer to prepare a functional fibrous powder coated with the acrylate copolymer, and mixing the functional fibrous powder with the natural polymer and solvent to prepare a molding composition.

It is preferable that the molding composition comprises 5~30% by weight of the fibrous powder, 1~20% by weight of the acrylate copolymer, 10~50% by weight of the natural polymer, 30~60% by weight of the solvent, and, optionally, 0.05~2% by weight of the preservative. Preferably, the mixing ratio of the fibrous powder and acrylate copolymer is in the range of 1:0.1~2. The solvent is preferably selected from water, alcohol and a basic or acidic aqueous solution.

The natural fiber can be derived from such natural resources as needle leaf or broadleaf trees, straw, grass, sugarcane, bamboo, woody stem, phloem fiber, leaf fiber, seedlings etc., and chemical properties thereof vary depending on the cellulose content. Especially, the hydrophilic property of the fiber is very important for the process of the present invention since water is used as a medium in the processes of grinding, degrading and beating of the fiber precursor.

Typically, pulp cellulose fibers carry negative charge of more than 500 meq, and therefore, they tend to conglomerate. Even when pulp cellulose fibers are mixed with a natural starch, inter-molecular interaction therebetween is still weak and the water resistance of the composition is poor since both the fiber and the natural starch are negatively charged.

In accordance with the present invention, the cellulose fibers are pulverized to reduce the negative charge to 150~250 meq, and mixed with an acrylate copolymer having positive charge of 50~300 meq.

Figure 1B:
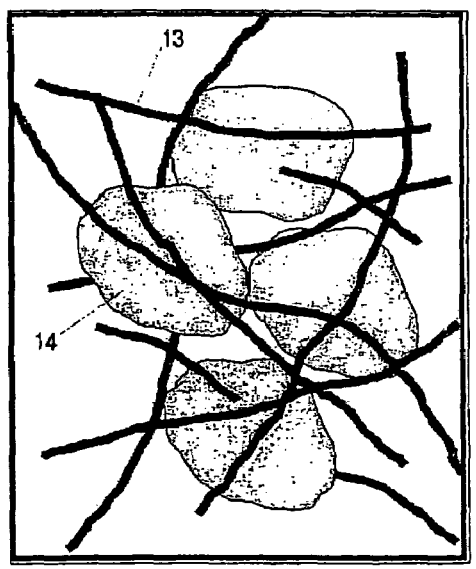

FIG. 1 schematically depicts the structure of the inventive biodegradable composition. As shown in FIG. 1 (a) and (b), negatively charged fiber (10) is coated with the positively charged acrylate polymer (12) to form a matrix (13) in which negative charged natural polymer (14) is dispersed. FIG. 1 (a) and (b) respectively show the initial and final states of the interaction between the functional fibrous powder and natural polymer.

Such interaction between opposing charges enhances the binding between the components of the inventive composition to improve its strength and water resistance of an article molded from the inventive composition.

Figure 2:
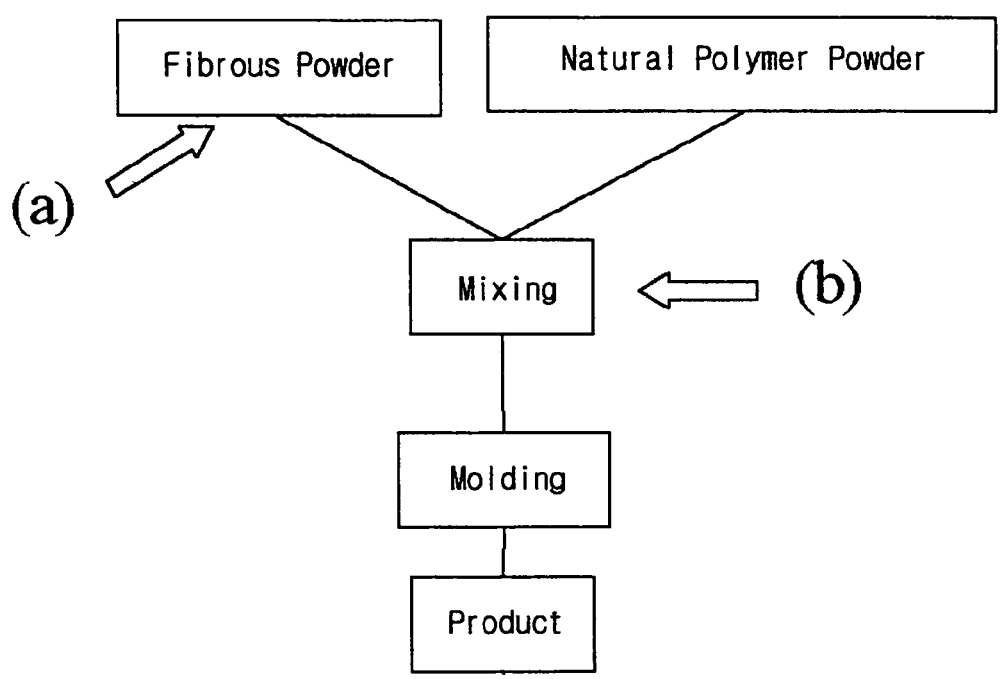
FIG. 2: a flow diagram for preparing the biodegradable composition in accordance with one embodiment of the present invention.
Figure 3A:
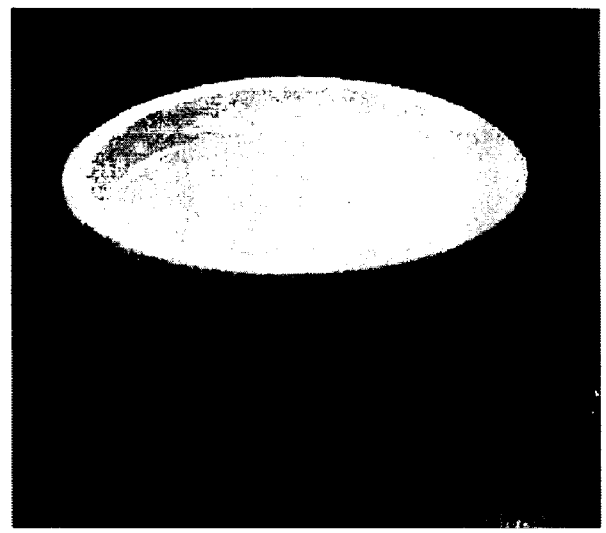
FIG. 3: photographs showing the time-dependent degradation of the composition in accordance with the present invention.
Figure 3B:
Figure 3C:
Figure 3D:
Figure 3E:
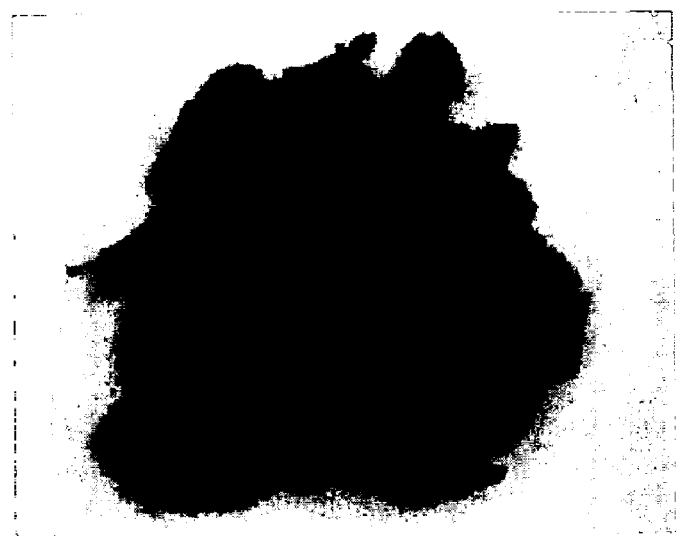
Figure 3F:
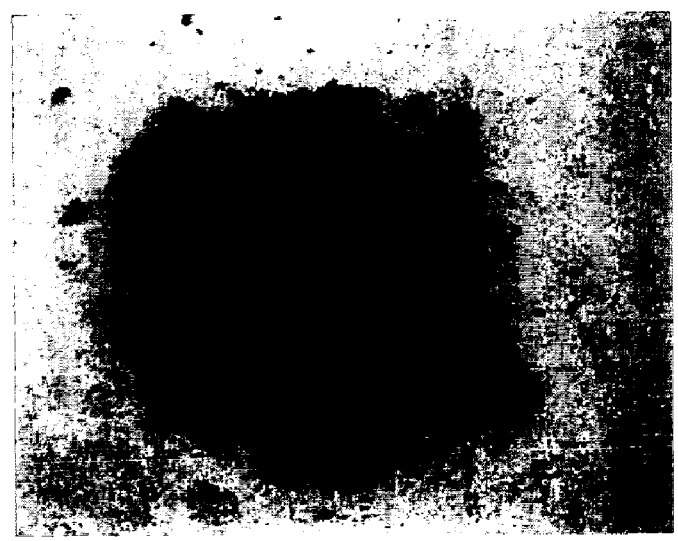

FIG. 2 is a schematic flow diagram of the process for preparing a biodegradable composition in accordance with the present invention. A fibrous powder and a natural polymer powder may be dry mixed. A water resistant acrylate copolymer may be mixed with the fibrous powder in advance to provide a functional fibrous powder (FIG. 3 process (a)) or added to a mixture of fibrous powder and natural polymer powder together with a solvent (FIG. 3 process (b)).

In process (a), the functional fibrous powder whose surface is uniformly coated with the cationic acrylate copolymer can be obtained by mixing the fibrous powder with the acrylate copolymer in a ratio of 1:0.1~2 at 80~90° C. for about 1 hr.

Preferably, 30~50 parts by weight of the fibrous powder and 5~50 parts by weight of the acrylate copolymer are mixed with 100 parts by weight of the natural polymer.

A molding composition can be prepared by adding a solvent, and optionally a preservative to the inventive biodegradable composition and stirring the mixture at 20~90° C., preferably 50~90° C. The solvent may be water, alcohol, a basic or acidic aqueous solution or a mixture thereof. Molding composition may comprise 5~30% by weight of the fibrous powder, 1~20% by weight of the acrylate copolymer, 10~50% by weight of the natural polymer, 30~60% by weight of the solvent, and optionally 0.05~2% by weight of the preservative.

A molding composition can be formed into a desired shape using a mold heated to a temperature of 100~250° C., preferably 140~220° C. at a pressure of 0.5~8 kgf/cm$^2$, preferably 1~5 kgf/cm$^2$ for 10 seconds to 5 minutes, preferably 60 seconds to 5 minutes, to obtain a biodegradable article having improved water resistance, formability and durability.

The present invention is further described and illustrated in Examples, which are, however, not intended to limit the scope of the present invention.

EXAMPLE 1

35 parts by weight of anionic corn starch, 14 parts by weight of a fibrous powder derived from needle-leaf tree, 3 parts by weight of the acrylate copolymer of formula 1 (R1 is dimethyl amino, R2 is n-buthyl, R3 is acrylonitrile and R4 is styrene; l, m, n and x are 0.4, 0.3, 0.1 and 0.2, respectively) and 48 parts by weight of water were mixed in a double jacket reactor for 20 minutes to prepare a molding composition. The acrylate copolymer was a milky suspension having a solid content of 20~24%, pH 4~6, and a viscosity of 80~100 cps at 25° C.

EXAMPLES 2 TO 5 AND COMPARATIVE EXAMPLE

The procedure of Example 1 was repeated using the components shown in Table 1.

TABLE 1

| Parts by weight | Natural polymer | Fibrous powder | Acrylate copolymer | Water | Total |
| --- | --- | --- | --- | --- | --- |
| Example 1 | 35 | 14 | 3 | 48 | 100 |
| Example 2 | 35 | 14 | 6 | 45 | 100 |
| Example 3 | 35 | 14 | 9 | 42 | 100 |
| Example 4 | 35 | 14 | 12 | 39 | 100 |
| Example 5 | 35 | 14 | 15 | 36 | 100 |
| Com. Ex. | 35 | 14 | 0 | 51 | 100 |

EXAMPLES 6 TO 10

The procedures of Examples 1 to 5 were repeated except that potato starch and the acrylate copolymer of formula 1 wherein R1 is methyl were used.

EXAMPLES 11 TO 15

The procedures of Examples 1 to 5 were repeated except that tapioca starch, a fibrous powder derived from broadleaf tree and the acrylate copolymer of formula 1 wherein R2 is isopropyl were used.

EXAMPLES 16 TO 21

The procedure of Example 1 was repeated except that sodium benzoate, a preservative, was additionally used together the components shown in Table 2.

TABLE 2

| Parts by weight | Natural polymer | Fibrous powder | Acrylate copolymer | Preservative | Water | Total |
|---|---|---|---|---|---|---|
| Example 16 | 35 | 14 | 9 | 0.05 | 41.95 | 100 |
| Example 17 | 35 | 14 | 9 | 0.1 | 41.9 | 100 |
| Example 18 | 35 | 14 | 9 | 0.2 | 41.8 | 100 |
| Example 19 | 35 | 14 | 12 | 0.05 | 38.95 | 100 |
| Example 20 | 35 | 14 | 12 | 0.1 | 38.9 | 100 |
| Example 21 | 35 | 14 | 12 | 0.2 | 38.8 | 100 |

EXAMPLES 22 TO 27

The procedures of Examples 16 to 21 were repeated except that potato starch, the acrylate copolymer of formula 1 wherein R1 is methyl and potassium sorbate as a preservative were used.

EXAMPLES 28 TO 32

The procedure of Example 1 was repeated except that a fibrous powder derived from needle leaf trees was mixed with the acrylate copolymer at 60° C. in advance to form a pretreated functional fibrous powder together the components shown in Table 3.

TABLE 3

| Parts by weight | Natural polymer | Pretreated fibrous powder | Sodium benzoate | Water | Total |
|---|---|---|---|---|---|
| Example 28 | 35 | 18 | 0 | 47 | 100 |
| Example 29 | 35 | 18 | 0.05 | 46.95 | 100 |
| Example 30 | 35 | 18 | 0.1 | 46.9 | 100 |
| Example 31 | 35 | 18 | 0.15 | 46.85 | 100 |
| Example 32 | 35 | 18 | 0.2 | 46.8 | 100 |

EXAMPLES 33 TO 37

The procedures of Examples 28 to 32 were repeated except that a fibrous powder derived from broadleaf tree and potassium sorbate instead of sodium benzoate were used.

Containers or trays were formed by injecting the compositions prepared in Examples 1 to 37 and Comparative example into a mold and molding at 180° C. and 3 kgf/cm² for 150 seconds. The formed containers or trays were examined for the following properties and the results are shown in Table 4.

(1) Water Resistance

The water resistance of each container was examined by filling the container with 25° C. or 98° C. water and measuring the time before water leakage occurred.

A: water leakage was not observed for more than 30 minutes

B: water leakage was not observed for 5 to 30 minutes

C: water leakage was not observed for 1 to 5 minutes

D: water leakage was observed within 1 minute (2) Formability:

⊚: The surface was smooth and no wrinkle or pinhole was found.

○: The surface was relatively coarse but no wrinkle or pinhole was found.

X: Wrinkles or pinholes were found on the surface, unable to mold.

(3) Dispersibility

The composition was stirred at a rate of 45 rpm for 10 min and examined the surface under a microscope with a magnification of 20.

⊚: homogeneously dispersed

○: The number of lump parts was 5 or less.

X: The number of lump parts was more than 5.

(4) Compression Strength

Strength at break of a container when one side of the container was pressed by a load cell at a rate of 2 mm/s.

⊚: higher than 5 kg·m/s²

○: 3~5 kg·m/s²

X: lower than 3 kg·m/s²

(5) Flexibility

The distance of the load cell moved when the load cell contacted the container surface until the container was broken during the compression strength measurement.

⊚: more than 20 mm

○: 15~20 mm

X: less than 15 mm (6) Odor

Three examiners smelled the container to check for any unpleasant odor different from the unique odor of starch.

N: no

Y: yes (7) Color Change

The color of the container formed was compared with the color of a standard composition (corn starch 34% by weight, fibrous powder 14% by weight and water 42% by weight).

N: no

Y: yes

TABLE 4

| | water resistance | | formability | dispersibility | compression Strength | flexibility | odor | color change |
|---|---|---|---|---|---|---|---|---|
| | 25° C. | 98° C. | | | | | | |
| Com. Ex. | D | D | ⊚ | X | X | X | N | N |
| Ex. 1 | B | C | ⊚ | ○ | ○ | ○ | N | N |
| Ex. 2 | B | B | ⊚ | ⊚ | ⊚ | ⊚ | N | N |
| Ex. 3 | A | B | ⊚ | ⊚ | ⊚ | ⊚ | N | N |
| Ex. 4 | A | A | ⊚ | ○ | ○ | ○ | N | N |
| Ex. 5 | A | A | ○ | ○ | ○ | ○ | N | N |
| Ex. 6 | B | C | ⊚ | ○ | ○ | ○ | N | N |
| Ex. 7 | B | B | ⊚ | ⊚ | ⊚ | ⊚ | N | N |
| Ex. 8 | A | B | ⊚ | ⊚ | ⊚ | ⊚ | N | N |
| Ex. 9 | A | A | ○ | ○ | ○ | ○ | N | N |

TABLE 4-continued

| | water resistance | | | | compression | | | color |
|---|---|---|---|---|---|---|---|---|
| | 25° C. | 98° C. | formability | dispersibility | Strength | flexibility | odor | change |
| Ex. 10 | A | A | ○ | ○ | ○ | ○ | N | N |
| Ex. 11 | B | C | ◎ | ○ | ○ | ○ | N | N |
| Ex. 12 | B | B | ◎ | ◎ | ◎ | ◎ | N | N |
| Ex. 13 | A | B | ◎ | ◎ | ◎ | ◎ | N | N |
| Ex. 14 | A | A | ◎ | ○ | ○ | ○ | N | N |
| Ex. 15 | A | A | ○ | ○ | ○ | ○ | N | N |
| Ex. 16 | A | B | ◎ | ◎ | ◎ | ◎ | N | N |
| Ex. 17 | A | B | ◎ | ◎ | ◎ | ◎ | N | N |
| Ex. 18 | A | B | ◎ | ◎ | ◎ | ◎ | Y | Y |
| Ex. 19 | A | A | ◎ | ○ | ○ | ○ | N | N |
| Ex. 20 | A | A | ◎ | ○ | ○ | ○ | Y | Y |
| Ex. 21 | A | A | ◎ | ○ | ○ | ○ | Y | Y |
| Ex. 22 | A | B | ◎ | ◎ | ◎ | ◎ | N | N |
| Ex. 23 | A | B | ◎ | ◎ | ◎ | ◎ | N | N |
| Ex. 24 | A | B | ◎ | ◎ | ◎ | ◎ | Y | Y |
| Ex. 25 | A | A | ◎ | ○ | ○ | ○ | N | N |
| Ex. 26 | A | A | ◎ | ○ | ○ | ○ | N | N |
| Ex. 27 | A | A | ◎ | ○ | ○ | ○ | Y | Y |
| Ex. 28 | A | A | ◎ | ◎ | ◎ | ◎ | N | N |
| Ex. 29 | A | A | ◎ | ◎ | ◎ | ◎ | N | N |
| Ex. 30 | A | A | ◎ | ◎ | ◎ | ◎ | N | N |
| Ex. 31 | A | A | ◎ | ◎ | ◎ | ◎ | N | N |
| Ex. 32 | A | A | ◎ | ◎ | ◎ | ◎ | Y | Y |
| Ex. 33 | A | A | ◎ | ◎ | ◎ | ◎ | N | N |
| Ex. 34 | A | A | ◎ | ◎ | ◎ | ◎ | N | N |
| Ex. 35 | A | A | ◎ | ◎ | ◎ | ◎ | N | N |
| Ex. 36 | A | A | ◎ | ◎ | ◎ | ◎ | N | N |
| Ex. 37 | A | A | ◎ | ◎ | ◎ | ◎ | Y | Y |

As shown in Table 4, the containers prepared by molding compositions of Examples 1 through 37 show improved performance characteristics in terms of water resistance, formability, homogeneity, impact strength and flexibility, while the composition of the comparative example performed poorly.

Resistance to Fungi Growth

Meanwhile, resistance to microorganism growth was evaluated by placing ten (10) samples of every compositions prepared in comparative example and Examples 2, 3, 17, 18, 23, 24, 29 and 30 in a thermohydrostat maintained at 30° C. and 90% of relative humidity and determining the number of days until the first fungi growth was detected.

TABLE 5

| Example | Days |
|---|---|
| Comparative Ex. | 2.5 |
| Example 2 | 52.5 |
| Example 3 | 68.5 |
| Example 17 | 140.3 |
| Example 18 | 152.5 |
| Example 23 | 138.5 |
| Example 24 | 153.8 |
| Example 29 | 132.5 |
| Example 30 | 143.5 |

As shown in Table 5, antifugal property of the composition is improved by using the water resistant acrylate copolymer and preservatives.

Biodegradability

Biodegradation tests were conducted so as to examine the biodegradability of the inventive compositions. Containers molded by using compositions of Examples (see FIG. 3a) were buried 1 meter deep under ground and observed every week. FIGS. 3a through 3f are photographs of the containers at days 7, 15, 30, 60 and 90 days after burial. All the containers were decomposed into composts within 3 months. Thus, the inventive composition provides an environmental friendly container which can be completely decomposed in the ground.

As can be seen from the above results, a biodegradable composition of the present invention, which comprises a water resistant acrylate copolymer, fibrous powder and a natural polymer, has an improved water resistance and durability, and thus, it can be advantageously used to prepare containers for instant food, e.g., cup noodles.

While the invention has been described with respect to the above specific embodiments, it should be recognized that various modifications and changes may be made to the invention by those skilled in the art which also fall within the scope of the invention as defined by the appended claims.

What is claimed is:

1. A biodegradable composition comprising a fibrous powder matrix coated with a cationic acrylate copolymer and an anionic natural polymer dispersed in the matrix.

2. The biodegradable composition of claim 1, wherein the natural polymer is an anionic starch whose functional group is not substituted.

3. The biodegradable composition of claim 2, wherein the starch is derived from corn, potato, wheat, rice, tapioca or sweet potato.

4. The biodegradable composition of claim 1 comprising 30~50 parts by weight of the fibrous powder and 5~50 parts by weight of the acrylate copolymer based on 100 parts by weight of the natural polymer.

5. The biodegradable composition of claim 1, wherein the fiber length of the fibrous powder is in the range of 10 to 90 μm.

6. The biodegradable composition of claim 1, wherein the fibrous powder is derived from wood, straw, sugarcane, bamboo, woody stem, phloem fiber, leaf fiber or seedlings.

7. The biodegradable composition of claim 1, wherein the acrylate copolymer has the structure of formula I:

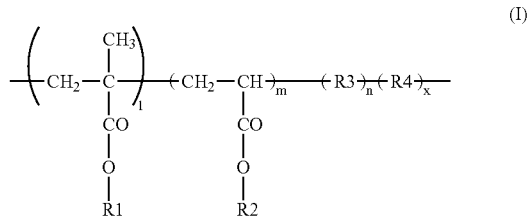

wherein R1 and R2 are independently $C_{1-12}$ alkyl, alkoxyalkyl, hydroxyalkyl, glycidyl or 2-(dimethyl amino) ethyl;

R3 and R4 are independently a monomeric unit selected from the group consisting of (meth)acrylic acid, N-methylol acrylamide, styrene, vinylacetate, vinylalcohol, acrylonitrile, acrylamide, maleic anhydride, maleic acid, 1,3-butadiene, diallylphthalate, itaconic acid and neopentylglycol; and l, m, n and x are mole fractions in the ranges of 0.2 to 0.6, 0.1 to 0.6, 0.05 to 0.5 and 0.05 to 0.5, respectively.

8. The biodegradable composition of claim 7, wherein R1 and R2 are independently selected from methyl, ethyl, isopropyl, n-butyl, isobutyl, tert-butyl, 2-hydroxyethyl, 2-ethoxyethyl, decyl, 2-ethylhexyl, 2-hydroxypropyl, glycidyl, lauryl and 2-(dimethylamino)ethyl.

9. The biodegradable composition of claim 1 further comprising 0.05~2% by weight of a preservative based on the total weight of the composition.

10. The biodegradable composition of claim 9, wherein the preservative is selected from the group consisting of sorbic acid, potassium sorbate, sodium benzoate, sodium propionate, calcium propionate, dehydrosodium acetate and butyl p-hydroxybenzoate.

11. A process for preparing the biodegradable composition of claim 1 comprising mixing the fibrous powder with the acrylate copolymer, the natural polymer, a solvent and, optionally, a preservative at 20~90° C. to prepare a molding composition.

12. The process of claim 11, wherein the mixing step is conducted by two-step process comprising:
a) mixing the fibrous powder with an acrylate copolymer to prepare a functional fibrous powder coated with the acrylate copolymer; and
b) mixing the functional fibrous powder with the natural polymer and a solvent to prepare a molding composition.

13. The process of claim 11, wherein the molding composition comprises 5~30% by weight of the fibrous powder, 1~20% by weight of the acrylate copolymer, 10~50% by weight of the natural polymer, 30~60% by weight of the solvent and optionally, 0.05~2% by weight of the preservative.

14. The process of claim 12, wherein the mixing ratio of the fibrous powder and the acrylate copolymer is in the range of 1:0.1~2.

15. The process of claim 11, wherein the solvent is water, alcohol, a basic or acidic aqueous solution or a mixture thereof.

16. The process of claim 11 further comprising forming the molding composition into a desired shape using a mold heated to a temperature of 100~250° C. at a pressure of 0.5~8 kgf/cm$^2$ for 10 seconds to 5 minutes.

* * * * *